United States Patent
Asselin et al.

(10) Patent No.: US 12,432,004 B2
(45) Date of Patent: Sep. 30, 2025

(54) ROADM ARCHITECTURE FOR WIDE SPECTRUM CHANNELS

(71) Applicant: Ciena Corporation, Hanover, MD (US)

(72) Inventors: Serge Asselin, Kanata (CA); David W. Boertjes, Nepean (CA)

(73) Assignee: Ciena Corporation, Hanover, MD (US)

( * ) Notice: Subject to any disclaimer, the term of this patent is extended or adjusted under 35 U.S.C. 154(b) by 45 days.

(21) Appl. No.: 18/277,927

(22) PCT Filed: Apr. 14, 2022

(86) PCT No.: PCT/US2022/024830
§ 371 (c)(1),
(2) Date: Aug. 18, 2023

(87) PCT Pub. No.: WO2023/027776
PCT Pub. Date: Mar. 2, 2023

(65) Prior Publication Data
US 2024/0137143 A1 Apr. 25, 2024
US 2024/0235716 A9 Jul. 11, 2024

Related U.S. Application Data

(60) Provisional application No. 63/237,698, filed on Aug. 27, 2021.

(51) Int. Cl.
*H04J 14/02* (2006.01)

(52) U.S. Cl.
CPC .. *H04J 14/02126* (2023.08); *H04J 14/02122* (2023.08)

(58) Field of Classification Search
CPC ............ H04J 14/0212; H04J 14/02122; H04J 14/0217; H04J 14/0216; H04J 14/022;
(Continued)

(56) References Cited

U.S. PATENT DOCUMENTS 6,618,193 B1   9/2003  Boertjes
9,838,763 B2   12/2017 Swinkels et al.
(Continued)

FOREIGN PATENT DOCUMENTS

EP   3 503 443 A1   6/2019

OTHER PUBLICATIONS

Shuto Yamamoto et al., "First demonstration of C + L band CDC-ROADM with simple node configuration using multiband switching devices," 2021 Optical Society of America, 10 pgs.
(Continued)

*Primary Examiner* — Hibret A Woldekidan
(74) *Attorney, Agent, or Firm* — Baratta Law PLLC; Lawrence A. Baratta, Jr.

(57) ABSTRACT

A Reconfigurable Optical Add/Drop Multiplexer (ROADM) node includes a plurality of degrees; and one or more fiber/space switches, wherein each of the plurality of degrees connect to the one or more fiber/space switches, and the one or more fiber/space switches are configured to interconnect any of the plurality of degrees and optionally one or more add/drop components. The plurality of degrees are partially interconnected to one another, while supporting any-to-any interconnect based on a configuration of the one or more fiber/space switches.

20 Claims, 7 Drawing Sheets

(58) Field of Classification Search
CPC ............... H04J 14/0204; H04J 14/0205; H04J 14/0213; H04J 14/02126; H04J 14/0201; H04J 14/02; H04J 14/021; H04Q 11/0005; H04Q 2011/0016; H04Q 11/0062; H04Q 2011/0024
See application file for complete search history.

(56) References Cited

U.S. PATENT DOCUMENTS

| | | |
|---|---|---|
| 11,196,504 B1 | 12/2021 | Frankel et al. |
| 11,272,269 B1 | 3/2022 | Chedore et al. |
| 2003/0042402 A1 | 3/2003 | Boertjes et al. |
| 2008/0181605 A1 | 7/2008 | Palacharla et al. |
| 2009/0232497 A1* | 9/2009 | Archambault ...... H04J 14/0297 398/50 |
| 2015/0071633 A1* | 3/2015 | Mehrvar ............. H04J 14/0212 398/49 |
| 2019/0191232 A1* | 6/2019 | Jones ................... H04J 14/0213 |
| 2020/0328836 A1* | 10/2020 | Koopferstock ..... H04J 14/0212 |
| 2021/0194607 A1 | 6/2021 | Shiner et al. |
| 2022/0132228 A1 | 4/2022 | Frankel et al. |
| 2022/0149938 A1 | 5/2022 | Pei et al. |
| 2022/0329033 A1 | 10/2022 | Demars et al. |
| 2023/0044243 A1 | 2/2023 | MacKay et al. |
| 2023/0254041 A1 | 8/2023 | Pei et al. |

OTHER PUBLICATIONS

Jul. 5, 2022, International Search Report and Written Opinion for International Patent Application No. PCT/US2022/024830.

* cited by examiner

102 SELECTIVELY INTERCONNECTING A PLURALITY OF DEGREES AND/OR ONE OR MORE ADD/DROP COMPONENTS VIA ONE OR MORE FIBER/SPACE SWITCHES, SUCH THAT THERE IS A PARTIAL INTERCONNECT WHILE SUPPORTING ANY-TO-ANY INTERCONNECT BASED ON A CONFIGURATION OF THE ONE OR MORE FIBER/SPACE SWITCHES

↓

104 SWITCHING SPECTRAL SLICES VIA THE ONE OR MORE FIBER/SPACE SWITCHES BETWEEN THE PLURALITY OF DEGREES AND/OR THE ONE OR MORE ADD/DROP COMPONENTS, EACH SPECTRAL SLICE INCLUDING A SWATH OF SPECTRUM SWITCHABLE IN THE ROADM NODE

↓

106 ADJUSTING THE INTERCONNECTING OF THE PLURALITY OF DEGREES AND/OR THE ONE OR MORE ADD/DROP COMPONENTS VIA THE ONE OR MORE FIBER/SPACE SWITCHES

↓

108 WITH THE ONE OR MORE FIBER/SPACE SWITCHES INCLUDING TWO FIBER/SPACE SWITCHES, SELECTIVELY SWITCHING BETWEEN THE TWO FIBER/SPACE SWITCHES BASED ON FAILURES

ROADM ARCHITECTURE FOR WIDE SPECTRUM CHANNELS

CROSS-REFERENCE TO RELATED APPLICATION(S)

The present disclosure is a national stage of PCT Patent Application No. PCT/US2022/024830, filed Apr. 14, 2022, which claims priority to U.S. Provisional Patent Application No. 63/237,698, filed Aug. 27, 2021, the contents of each are incorporated by reference in their entirety.

FIELD OF THE DISCLOSURE

The present disclosure generally relates to optical networking. More particularly, the present disclosure relates to systems and methods for a Reconfigurable Optical Add/Drop Multiplexer (ROADM) architecture for wide spectrum channels.

BACKGROUND OF THE DISCLOSURE

In optical networks, a Reconfigurable Optical Add/Drop Multiplexer (ROADM) is a configuration, hardware equipment, etc. that can add, block, pass (express), drop, and switch channels at a wavelength (or portion of the optical spectrum) level in a Dense Wave Division Multiplexing (DWDM) system. At the network level, a ROADM node is a site in an optical network where channels are added, dropped, and/or expressed through. That is, ROADM nodes are terminal locations where traffic is accessed in an optical network. Each degree in a ROADM node includes components to support two fibers interconnected to the optical network, namely an ingress and egress fiber (transmit and receive). For example, a two-degree ROADM node has two network-facing ports (as described herein, a port can include two fibers—transmit and receive), and, generally, a W-degree node has W network-facing ports, W≥1.

ROADM nodes can be scaled today to support a higher number of Optical Multiplex Section (OMS) sections (or fiber degrees) in multiple ways:

1) WSS technology innovation: new Wavelength Selective Switch (WSS) technology can be developed to support higher levels of ROADM interconnect. The industry has to date provided the following increase in WSS port fan-out to support larger ROADM sizes: 1×5→1×9→1×20→1×32. As known in the art, WSS capability is quoted as 1×N where 1+N equals the number of total ports.

2) New ROADM planes can be overlayed to support growth, such as via Space Division Multiplexing (SDM). See, e.g., commonly-assigned U.S. Pat. No. 11,063,683, issued Jul. 13, 2021, and entitled "Scalable ROADM architecture with multi-plane switching," the contents of which are incorporated by reference.

3) WSS' can be interconnected in a partial mesh. By limiting the interconnectedness of ROADM degrees, more degrees can be supported.

Of course, optical networks continue to grow in bandwidth requirements, and these existing scaling approaches have shortcomings. ROADM sizes are constrained by current WSS technology limitations. New higher fan-out WSS technology increases the cost of all ROADM degrees. Overlaying photonic layer planes (SDM) can be costly, complex to manage, and result in stranded capacity on individual planes. Partially interconnected ROADMs are operationally complex to plan and configure, and static in nature. Recent developments in coherent modem technology have pushed transmission closer to the Shannon Limit which has resulted in increases in electro-optic bandwidth and therefore spectral occupancy of modems to support more capacity and lower cost. This shifts the focus from wavelength division multiplexing to space division multiplexing. In terms of the photonic systems this is a shift from higher channel count and modest degree count to low channel count and much higher degree count where degrees now encompass physical directions, multiple fiber pairs and spectral bands.

BRIEF SUMMARY OF THE DISCLOSURE

The present disclosure relates to systems and methods for a Reconfigurable Optical Add/Drop Multiplexer (ROADM) architecture for wide spectrum channels. In particular, the present disclosure views a ROADM from the perspective of slices of spectrum (i.e., media channels, super channels, etc.) as opposed to channels (e.g., 50 GHz, 100 GHz spaced channels, etc.). The number of spectral slices is less than or equal to the number of channels, e.g., both the C-band and L-band includes 9.6 THz and having spectral slices of 1.2 THz yields only 8 slices, far less than 192 channels (i.e., using 50 GHz spaced channels) between the combined C and L-band. Of course, 1.2 THz is an example value, and other values are contemplated. The spectral slice represents aggregate optical capacity requirements between two end points. In this manner, high-degree ROADMs are possible as the number of ports is significantly reduced. Also, the present disclosure includes the use of an optical switch between the degrees, instead of fixed fiber connectivity. The advantages of the present disclosure include the ability to build high-capacity, high-degree ROADM nodes with current optical component technology, without having to dedicate switching planes, such as in Space Division Multiplexing (SDM), etc. That is, the ROADM can be constructed with 1×8, 1×24, or 1×32 WSSs and 64×64, 128×128, etc. optical switches which are readily available. Stated differently, ROADM sizes, in terms of number of degrees, are no longer defined or constrained by available WSS technology (1×N). WSS technology now only defines the granularity at which the spectrum is switched. For instance, 1×9WSS can be used to construct any size of ROADM. The central space switch now defines nodal capacities. There is no need to continue to scale the optical component technology to achieve this architecture.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for a Reconfigurable Optical Add/Drop Multiplexer (ROADM) architecture for wide spectrum channels. The present disclosure describes a new ROADM architecture that is tailored to address future photonic layer connectivity requirements. In particular, the present disclosure views a ROADM from the perspective of slices of spectrum (i.e., media channels, super channels, etc.) as opposed to channels (e.g., 50 GHz, 100 GHz spaced channels, etc.). The number of spectral slices is less than or equal to the number of channels, e.g., both the C-band and L-band includes 9.6 THz and having spectral slices of 1.2 THz yields only 8 slices, far less than 192 channels (i.e., using 50 GHz spaced channels) between the combined C and L-band. Of course, 1.2 THz is an example value, and other values are contemplated. The spectral slice represents aggregate optical capacity requirements between two end points. In this manner, high-degree ROADMs are possible as the number of ports is significantly reduced. Also, the present disclosure includes the use of an optical switch between the degrees, instead of fixed fiber connectivity. The advantages of the present disclosure include the ability to build high-capacity, high-degree ROADM nodes with current optical component technology, without having to dedicate switching planes, such as in Space Division Multiplexing (SDM), etc. That is, the ROADM can be constructed with 1×8, 1×24, or 1×32 WSSs and 64×64, 128×128, etc. optical switches which are readily available. Stated differently, ROADM sizes, in terms of number of degrees, are no longer defined or constrained by available WSS technology (1×N). WSS technology now only defines the granularity at which the spectrum is switched. For instance, 1×9WSS can be used to construct any size of ROADM. The central space switch now defines nodal capacities. There is no need to continue to scale the optical component technology to achieve this architecture.

Also, the present disclosure includes additional possibilities for degrees besides an ingress and egress fiber. One example includes the so-called single fiber working where a single fiber carries both the transmit and receive light. Another example is multi-core, wherein multiple waveguides are used within the same fiber strand. Multi core may be very useful in terms of supporting the SDM applications. A third example is hollow core fiber which presents an even wider transmission window then current silica-based fiber technology. Those skilled in the art will recognize the term "degree" used herein contemplates any physical implementation and is not confined to two fibers—one ingress and one egress. Also, the architecture described herein can be viewed as replacing conventional ROADM degrees and may even include different terminology such as ingress/egress waveguides. Again, the term "degree" used herein contemplates such different terminology.

Given that network connection bandwidth requirements are forecasted to continue growing at a high Compound Annual Growth Rate (CAGR) and future gains in spectral transmission efficiency are expected to diminish, it can be ascertained that:

1) Site-to-site capacity requirements (A-Z connections) will require increasing amounts of spectrum to deliver the required traffic data rate.
2) More spectrum per connection will result in fewer unique A-Z connections per fiber pair. Of note, higher-capacity optical modems utilized larger amounts of spectrum than traditional 50 GHz spaced channels.
3) Larger ROADMs (higher degree count/more fiber pairs) will be required to meet aggregate nodal traffic requirements.

To date, ROADMs have predominantly been architected to support any-any switching of wavelengths between ROADM degrees. Since ROADMs typically terminate relatively few fiber pairs (typically 8 or fewer fiber pairs), and wavelength channel count per fiber pair is high (up to 96×50 GHz channels per C-band), an any-any switching architecture was sensible since there was a high probability that at least one wavelength per degree would need to connect to each of the 7 or fewer other ROADM degrees.

In the current approach, a ROADM is constructed to support full interconnect between degrees with a high channel count per fiber pair—96×50 GHz channels per C-band and 96×50 GHz channels per L-band for a total of 192×50 GHz channels for C+L band for a total of 9.6 THz of optical spectrum. With coherent optical modems, flexible grid spacing, and Media Channels (MC) (also referred to as super-channels), the channel count significantly decreases (although each "channel" has significantly more bandwidth). A media channel is a defined slice of optical spectrum which can include multiple Network Media Channels (NMCs) and which has the same A-Z routing in the network. Of note, every new generation of coherent modem operates at progressively higher baud rate and consumes correspondingly more spectrum, thereby reducing the number of channels that can be carried on a fiber. MC constructs allowing several NMC to be treated as a single wider channel further reduce total channel count. Note that older 50 GHz channel modems were also for the most part coherent modems.

However, the anticipated reduction in channel count per fiber, and the need to support increasing numbers of ROADM degrees per node will result in a change in ROADM nodal connectivity requirements whereby, individual ROADM degrees will only need to connect to a few other degrees or drop ports. To illustrate this point, if we assume that the average channel requirements per A-Z connection is 1.2 THz, then a fiber degree supporting C&L bands (9.6 THz of spectrum), will carry a maximum of 8 unique A-Z connections, i.e., 8 media channels. In large ROADMs of 16 degrees or more, this means that any individual degree will only need to connect a fraction of the other ROADM degrees.

This change in ROADM connectivity requirements paves the way for a new architecture that is outlined below. Specifically, the present disclosure contemplates architecting a ROADM based on media channels instead of based on individual channels. In this manner, a much larger ROADM can be constructed in terms of degrees, directions, and add/drop, all with existing optical components. That is, this solves the issue of scaling 1×N WSS technology, avoids ROADM planes in SDM, or needing to deploy parallel ROADM planes that risk stranding capacity.

The key components of this approach are fiber/space switches 12 to provide interconnectivity between degrees and to add/drop, and channels defined as large swaths of spectrum (e.g., 600 GHz, 1.2 THz, etc.). With this approach, there is not a need to connect every degree to every other degree, rather the fiber/space switches 12 can be used for interconnect. Of note, the fiber/space switches 12 can allow any degree to connect to any other degree and add/drop, but there is not a need to dedicate ports on the degrees for full interconnect, allowing less ports.

The new ROADM architecture has the following characteristics:

1) Utilizes less complex and lower cost ROADM WSS technology to build large nodes.

2) Replaces the fixed fiber interconnect modules, known as fiber shuffles or Fiber Interconnect Modules (FIMs), or alternately, the large quantity of optical cables used for interconnecting ROADM degrees with optical space switches (used as optical spine switches), i.e., the fiber/space switches 12. This enables any interconnect without the disadvantage of dedicating ports between every degree.

3) Includes a control system allowing ROADM degrees to be dynamically interconnected through the central optical switch fabric as required based on channel connectivity needs.

4) Employs a mechanism by which central switch fabrics can provide path redundancy through the ROADM node to avoid single points of failure, i.e., dual fiber/space switches 12.

The envisaged ROADM architecture looks at photonic layer connectivity in a different perspective which enables new levels of optimization and scaling, The new approach:

1) is designed to switch wide spectrum media channels that are sized to meet the aggregate capacity requirements of A-Z connections. These media channels can be occupied by a single very high baud rate NMC or multiple co-routed NMCs (superchannel). Contrary to existing ROADM architectures, this solution is not intended or capable of switching individual wavelengths of relatively low bandwidth (e.g., 50 GHz-100 GHz). The switching of individual wavelengths is still possible with subtending equipment, such as pre-combiners, multiplexers/demultiplexers, subtending optical switches, WSSs, etc.

2) Replaces the static full mesh interconnect of ROADM degrees, which becomes progressively more complex and costly as ROADM nodes are scaled up, with a programmable interconnect, i.e., the fiber/space switches 12, tailored to the connectivity requirements of the node.

Additionally, this new architecture introduces intra-nodal data path protection providing a new level of redundancy not available in existing architectures, i.e., dual i.e., the fiber/space switches 12.

Figure 1:
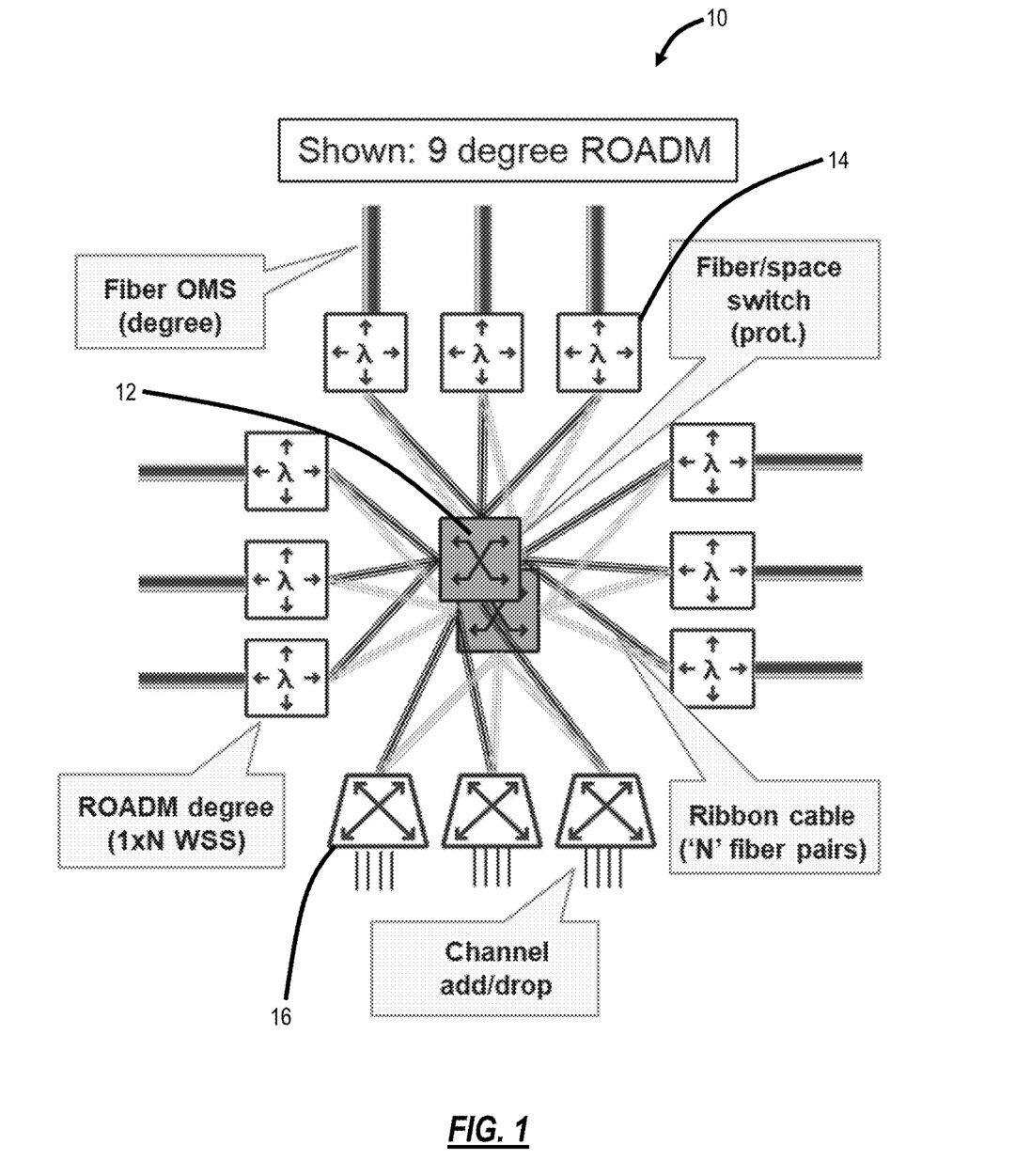
FIG. 1 is a diagram of an example 9-degree ROADM with optical add/drop and with degree-to-degree and optical add/drop switching based on superchannels or media channels.

FIG. 1 is a diagram of an example 9-degree ROADM 10 with optical add/drop and with degree-to-degree and optical add/drop switching based on superchannels or media channels. The ROADM 10 includes one or more fiber/space switches 12. In this example, there are two switches 12 for protection/redundancy. The ROADM 10 also includes degree devices 14, such as 1×N WSSs, other wavelength selective switching devices, etc. In this example, for illustration purposes, there are 9-degrees formed by the degree devices 14. Also, there can be optical add/drop devices 16 to support local add/drop. The degree devices 14 and the optical add/drop devices 16 can be the same or different type of devices. That is, the local add/drop can be treated as another degree.

The switches 12 can be N×N cross-point switches. For example, it is envisaged that the switches 12 can be 128×128 ports which is currently available. Of note, the switches 12 provide degree-to-degree connectivity. In the conventional approach, the degree-to-degree connectivity and the local add/drop is fixed, through fibered connections, such as by a fiber interconnect module, fiber shuffler, etc. The present disclosure removes this fixed connectivity in place of the intermediate switches 12.

Each of the degree devices 14 can include two common ports, facing the network for transmit and receive and M ports connecting to the switches 12. Of course, those skilled in the art will appreciate other components are also used such as amplifiers, etc., which are omitted for simplicity. The M ports are based on the spectral slicing. For example, assuming each superchannel is 1.2 THz, M would equal 8 to support all 9.6 THz across the C+L band. Of course, other numbers are contemplated, e.g., would be 16 for 600 GHz channels, 32 for 300 GHz channels, etc. Also, the present disclosure contemplates additional bands as well, besides the C+L band, such as the S-band, O-band, or any other future band. Those skilled in the art will recognize the approach described herein can be used in one band, in multiple bands, etc.

The switches 12 are configured to switch the superchannels between the degree 14 for express connections, degree to degrees, and the optical add/drop devices 16 for local add/drop.

Figure 2:
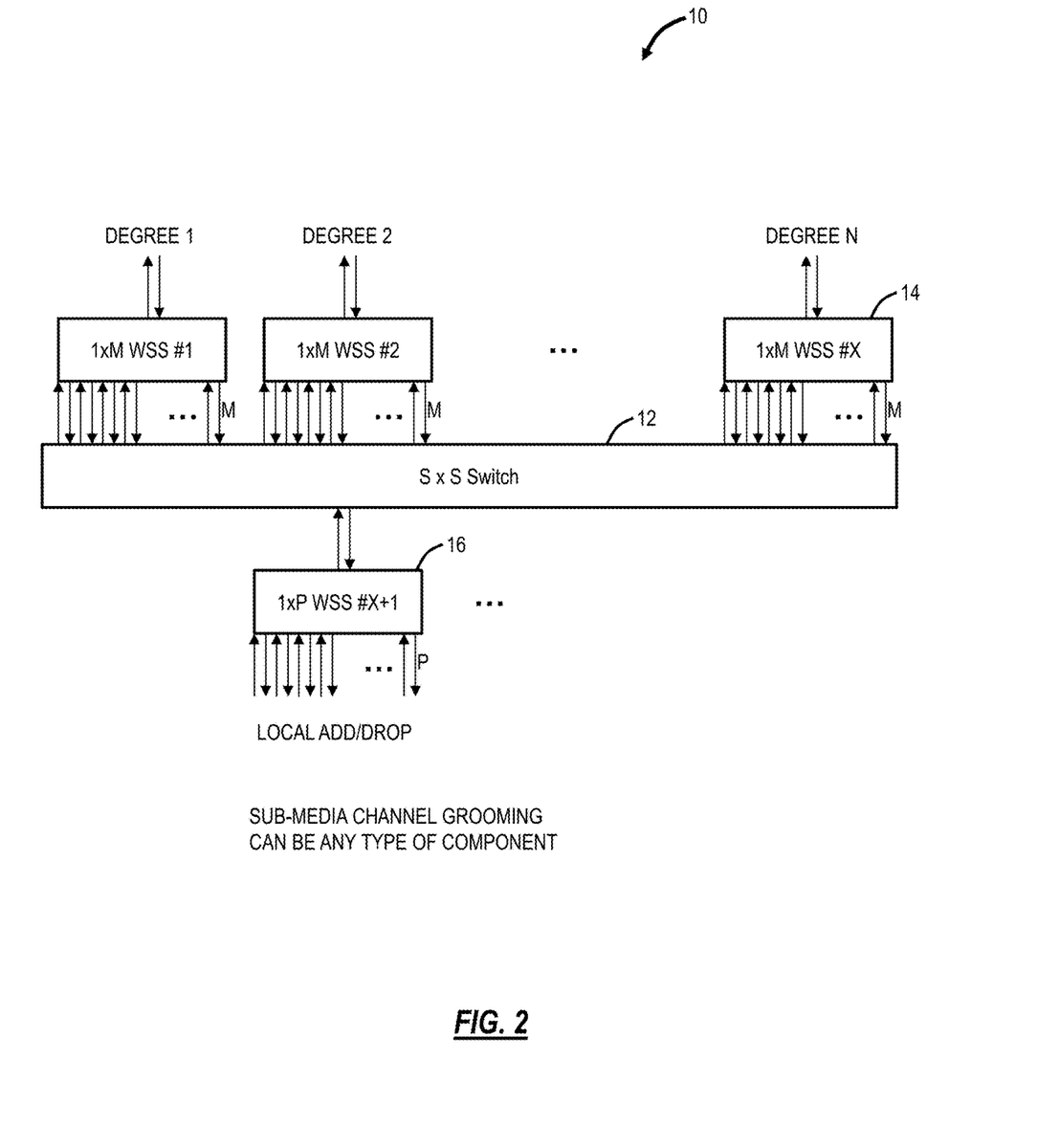
FIG. 2 is a diagram of additional detail and connectivity of an N-degree ROADM.

FIG. 2 is a diagram of additional detail and connectivity of an N-degree ROADM 10. The ROADM node can be part of an optical network and is responsible for local add/drop channels and node bypass. In the example of FIG. 2, the ROADM 10 includes a number of degrees equal to N, N is an integer, each degree being formed by a 1×M WSS 14, M is an integer, such as M=8, 24, 32, etc. Each degree includes a 1×M WSS 14, labeled as 1×M WSS #1, #2, . . . , #N. The degrees are input/output connectivity between the ROADM 10 and other nodes in an optical network. In this example, the ROADM node 10 can connect to N adjacent nodes in the optical network. For illustration clarity, FIG. 2 shows bidirectional connectivity. Thus, each of the degrees have a transmit (TX) and receive (RX) fiber. Also, those skilled in the art will recognize the ROADM 10 can include various other components such as pre/post amplifiers, Optical Channel Monitors (OCMs), Optical Service Channels (OSCs), and the like which are omitted for illustration purposes.

The ROADM 10 includes a 1×P WSS 16 for local add/drop of spectrum. In the ROADM 10, the local add/drop can be viewed as another degree. The degree 1×M WSSs 14 include two common ports that face the network and M individual ports facing inward, such as via an S×S switch 12. The local add/drop 1×P WSSs 16 can be the same devices as the degree 1×M WSSs 14, but include two common ports connecting to the S×S switch 12 and the remaining P ports connecting to subtending equipment, such as for sub-media channel grooming.

Again, the S×S switch 12 provides flexibility connectivity at the spectral slice level between the degree 1×M WSSs 14 and the local add/drop 1×P WSSs 16. In another embodiment, it is possible to exclude the S×S switch 12 and fiber cable the degree 1×M WSSs 14 and the local add/drop 1×P WSSs 16. Of note, this is less efficient relative to the S×S switch 12. For the size of the S×S switch 12, it is expected a modest port count will suffice, e.g., 128×128. For example, 128×128 would allow 8 spectral slices across up to 32 degrees while only having 1×8 WSS's for the degree WSSs 14, i.e., M=8. This seems sufficient, and is a significant advantage as it allows construction of a large degree site (32 degrees) with full add/drop with conventional optical components. If we start using switch ports for add/drop then we correspondingly reduce the number of degrees (8 add/drop ports is equivalent to one degree in this case).

Also, for example, 32×8 slices require a 256×256 port central switch. However, this can also be achieved with 2×128 port switches configured if connections are not protected (half the capacity through each spine switch). Note, as described herein, the S×S switch 12 can be referred to interchangeably as a spine switch, central switch, fiber/space switch, port switch, etc. The switches 12 can also be configured in 1:N (one protection for N working switches) central fabric spines as a mechanism not only to scale interconnect but also to provide redundancy, if required. In this example, 3×128 port switches in a 1:2 configuration would provide 8 slices+redundancy. 4×64 port switches is another configuration that would deliver 8 slices to 32 degrees (5 in a 1:4 config, if protection is required).

If the spectral slices were fixed, we could use thin film filters or Arrayed Waveguide Grating (AWGs) as this stage, as was done in many conventional ROADMs before the advent of the WSS. The reason to use the WSSs is that we can change the width of each spectral slice to account for differences in the data flow between pairs of degrees/add-drops. It is advantageous using the WSS for spectral shaping and equalization using the WSS. Intra-channel spectral shaping is of increasing importance as channel widths increase.

For the local add/drop, it is possible to omit the local add/drop 1×P WSSs 16. For example, it is possible to connect ports of the S×S switch 12 for direct local add/drop. In another embodiment, we could use a simple splitter/combiner, sometimes called a pre-combiner, along with the coherent transponders to allow more than one transponder per space switch port. For example, pre-combiners are described in commonly-assigned U.S. patent application Ser. No. 16/567,023, filed Sep. 11, 2019, and entitled "Upgradeable colorless, directionless, and contentionless optical architectures," the contents of which are incorporated by reference in their entirety. For example, the pre-combiners can be directly connected to the S×S switch 12.

Those of ordinary skill in the art will recognize other configurations are also possible to support the architecture of the ROADM 10. Further, the selection of M, N, P, S are implementation specific, and various values are contemplated. The selection of these values is generally a function of component availability, insertion loss, performance, etc. An advantage of the present disclosure is the ability to use conventional optical components. There is no need for a large port count WSS or other advanced switching components.

The local add/drop 1×P WSSs 16 in FIG. 2 are selectively connected to the degree of interest by the space S×S switch 12. This is why you could use the common ports of the WSS rather than the switch ports. The common ports can be connected to only one degree in this case (there is only one set of commons). Once connected, the add/drop 1×P WSSs 16 can select any slices which are to be sent to/from that degree. It could be the whole spectrum in the extreme. Of course, the ROADM 10 can include multiple add/drop 1×P WSSs 16, such as one for each degree.

Figure 3:
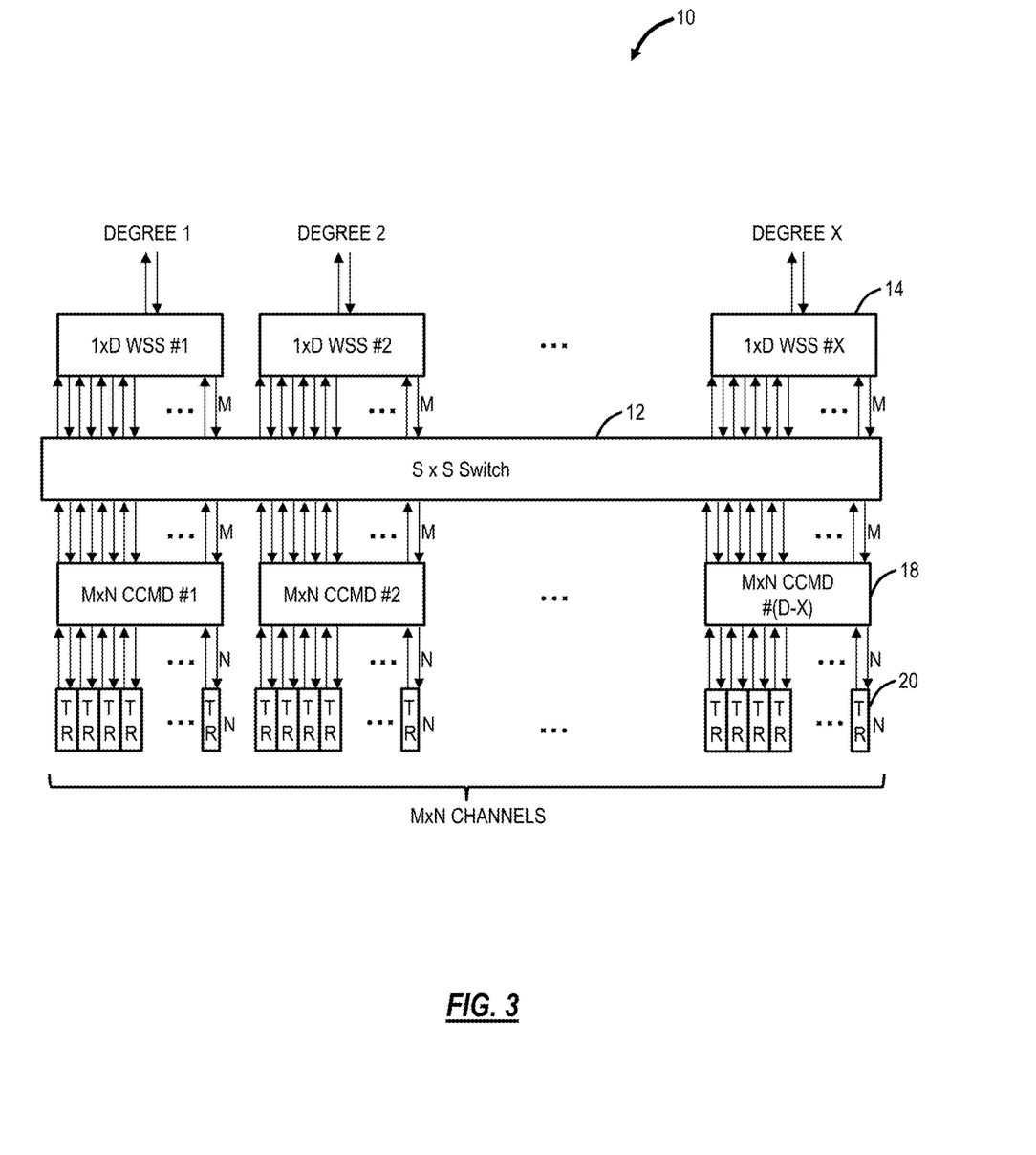
FIG. 3 is a diagram of additional detail and connectivity of an N-degree ROADM with a Colorless-Directionless (CD) architecture.
Figure 4:
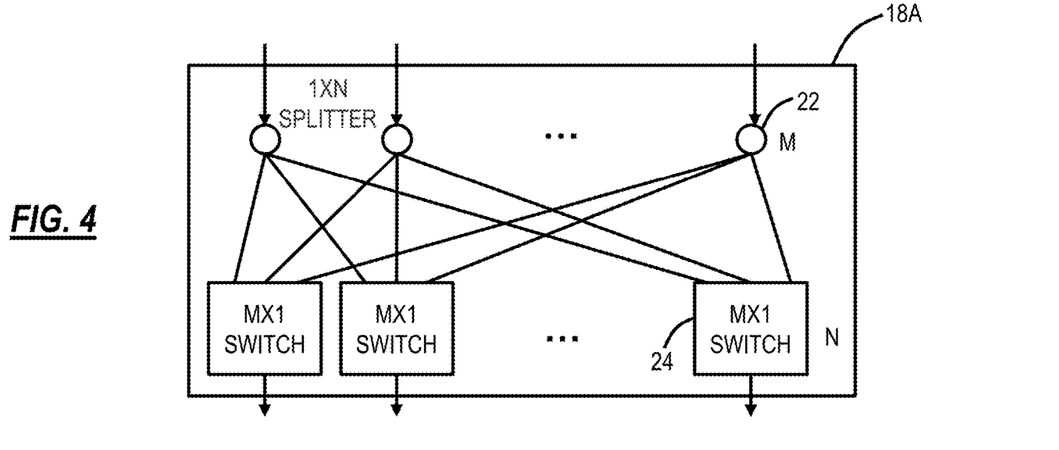
FIG. 4 is a block diagram of an implementation of a Colorless Channel Multiplexer/Demultiplexer (CCMD) utilizing Multicast Switches (MCS).
Figure 5:
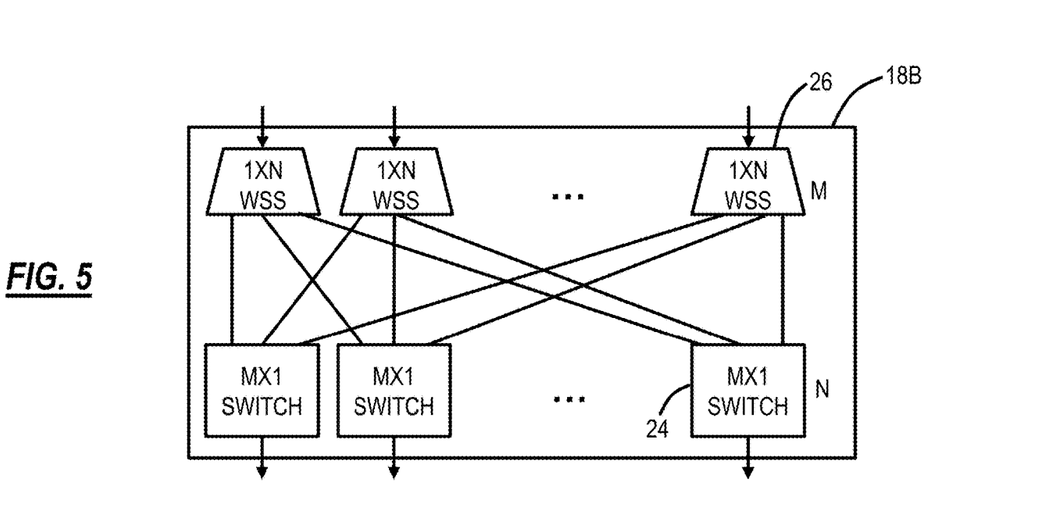
FIG. 5 is a block diagram of an implementation of a CCMD utilizing Contentionless Wavelength Selective Switches (CWSS).

FIG. 3 is a diagram of additional detail and connectivity of an N-degree ROADM 10 with a Colorless-Directionless (CD) architecture. The CD architecture includes M×N Colorless Channel Multiplexer/Demultiplexer (CCMD) 18. The ROADM 10 includes the M×N CCMD 18, labeled as M×N CCMD #1, #2, ..., #(D-X), for local add/drop of channels in a colorless, directionless, and contentionless manner. The number of degrees, X, can be any value between 1 and M. The ROADM 10 includes up to D-X M×N CCMDs 18. The M×N CCMD is an optical add/drop device that supports M degrees and N channels (optical modems). The M×N CCMDs 18 can be implemented using Multicast Switches (MCS) or Contentionless WSS (CWSS), and additional detail of the M×N CCMDs 18 is shown in FIGS. 4 and 5. The M×N CCMDs 18 are optical add/drop devices that generally include optical amplifiers, Multicast Optical Switches (MCS), etc. and are configured to support colorless multiplexing/demultiplexing in the ROADM 10. The M×N CCMDs 18 are directionless meaning any channel can be sent to any degree and contentionless as well, supporting more than one instance of a specific channel in the same M×N CCMD 18. Each of the M×N CCMDs 18 is connected to up to N optical modems 20. To support directionless operation, each of the M×N CCMDs 18 is connected to each of the 1×D WSSs 14, such as via the S×S switch 16.

FIG. 4 is a block diagram of an implementation of a Colorless Channel Multiplexer/Demultiplexer (CCMD) 18A utilizing Multicast Switches (MCS). FIG. 5 is a block diagram of an implementation of a CCMD 18B utilizing Contentionless Wavelength Selective Switches (CWSS). Both the CCMDs 18A, 18B are M×N devices supporting connectivity to M degrees and N channels/ports per device. The CCMD 18A includes an M-array of 1×N splitters/combiners 22, and an N-array of M×1 switches 24. The CCMD 18B includes an M-array of 1×N WSSs 26 and an N-array of M×1 switches 24. Thus the CCMD 18B is a CWSS-based M×N CCMD (optical add/drop device). On the channel side (facing the optical modems 20), both the CCMDs 18A, 18B utilize the M×1 switches 24 to direct a given channel/wavelength to a specific degree. The fundamental difference is that an MCS (CCMD 18A) uses a combiner to multiplex the channel ports whereas the Contentionless WSS uses a WSS.

For the MCS (CCMD 18A), when channels are multiplexed with a combiner, the out-of-band Amplified Spontaneous Emission (ASE) from all those channels add up (i.e., noise funneling). This is mitigated in newer optical modems by adding tunable filters at the output to remove the out-of-band ASE. This is because higher order modulation formats cannot afford the Optical Signal-to-Noise Ratio (OSNR) penalty from noise funneling.

The systems and methods described herein utilize the CWSS (CCMD 18B) with pre-combining of channels to improve channel/port scaling and cost. Conventional CDC architectures generally use the MCS (CCMD 18A), and it is expected that next-generation CDC architectures will move predominantly towards the CWSS (CCMD 18B) approach. Advantageously, the CWSS has a significantly lower loss (e.g., about 7 dB for a 1×32 WSS versus 13 dB for a 1×16 splitter), the potential to scale to higher port counts (than the MCS implementation) and channel filtering is built-in in the multiplexing direction to reduce noise funneling. The systems and methods herein address one of the adoption challenges for the CWSS in CDC architectures, namely port scaling and cost per port.

The CWSS requires two switching elements, namely the M-array of 1×N WSS 26 and the N-array of 1×M switches 24 (whereas the MCS has a single switching element with combiners/splitters). The M-array of 1×N WSS 26 can be realized with a single Liquid Crystal on Silicon (LCoS) chip, and each WSS 26 creates different diffraction angles for individual channels pointing at any of the N channel ports. The N-array of 1×M switches 24 can be realized with a Microelectromechanical system (MEMS) mirror array (a Planar Lightwave Circuit (PLC) design also possible) and is configured to point a particular channel port to one of the M-array of 1×N WSS 26.

The M×N CCMD 18 can be used for add/drop with programmable interconnect selected by the space switch. This could be accomplished by having the normal 2-stage add drop structure that we'd use for a CD ROADM where there is a WSS with the switch ports connected to the space switch 16 and a MUX/DEMUX element (which could be a fixed filter, a set of power combiners/splitters, or another WSS) connected to the common of the "degree" WSS. The difference here is that instead of needing the degree facing WSS to have as many ports as there are degrees, one only needs as many ports as supported transponders on that add/drop. In our case this is max 8. Let's assume that we use splitters and combiners and decide that 2 is enough. Then we need only two ports on the degree side and the space switch takes care of directing those 2 spectral slices to which ever degrees we wish. Furthermore, we could replace the WSS and MUX/DEMUX portion with an M×N WSS where the M and N are substantially reduced from typical CDC architectures today. We could also use only splitters and combiners and use the wavelength selectivity on the degree WSS to pass only the needed spectral slices on the degree(s) of interest.

Figure 6:
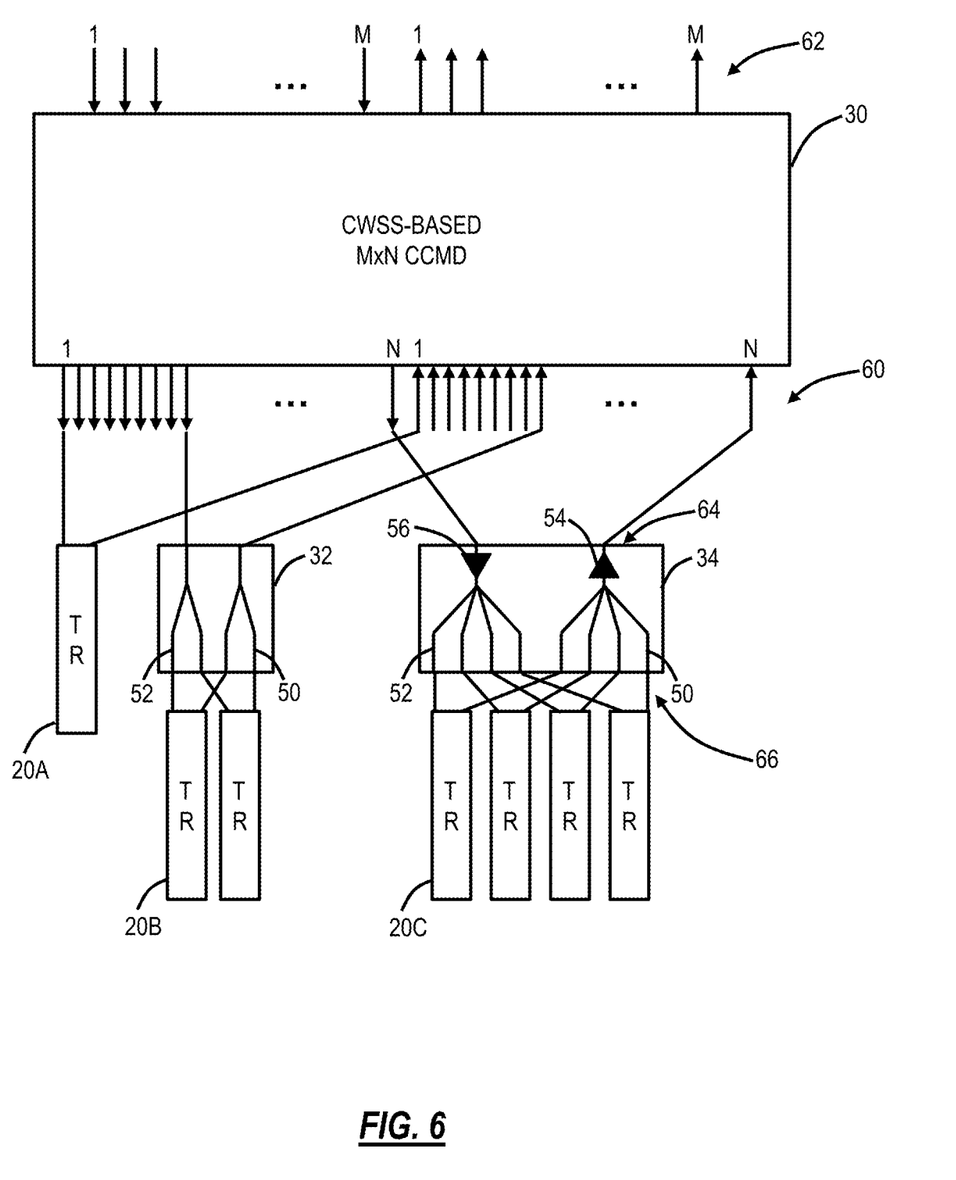
FIG. 6 is a block diagram of a CWSS-based M×N CCMD with channel pre-combiners.

FIG. 6 is a block diagram of a CWSS-based M×N CCMD 30 with channel pre-combiners 32, 34. The channel pre-combiners 32, 34 mitigate the limitations of the ROADM architecture by pre-combining channels being added through the CDC ROADM, thus allowing the multiplication of channels per port when they are co-routed (originate and terminate at the same nodes). Of note, the channel pre-combiners 32, 34 can be used to form media channels, spectral slices.

FIG. 6 illustrates three approaches for channel add/drop with the CWSS-based M×N CCMD 30, namely a direct connection with an optical modem 20A, a passive combination of two optical modems 20B with a passive pre-combiner 32, and an amplified combination of four optical modems 20C with an amplified pre-combiner 34. The optical modem 20A directly connects to the CWSS-based M×N CCMD 30. Thus one of the N ports of the CWSS-based M×N CCMD 30 is used for a single channel. The channel pre-combiners 32, 34 connect in a similar manner as the optical modem 20A, each taking up a port of the N ports of the CWSS-based M×N CCMD 30, but the channel pre-combiners 32, 34 have multiple ports on an add/drop side. In this example, the passive pre-combiner 32 has two ports, thus it operates as to double the port it connects to on the CWSS-based M×N CCMD 30. The amplified pre-combiner 34 has four ports, thus it operates to quadruple the port it connects to on the CWSS-based M×N CCMD 30.

The channel pre-combiners 32, 34 include couplers 50 in the transmit direction to combine the channels from the optical modems 20B, 20C before they are coupled to the CWSS-based M×N CCMD 30. The channel pre-combiners 32, 34 include splitters 52 in the receive direction to split the channels to the optical modems 20B, 20C from the CWSS-based M×N CCMD 30. The channel pre-combiners 34 can also include an amplifier 54 in the transmit direction and an amplifier 56 in the receive direction.

The channel pre-combiners 32, 34 act as a local add/drop port multiplier. Thus, cost/port and the maximum number of ports per CWSS-based M×N CCMD 30 scales with the pre-combining. The approach can pre-combine any number of channels (e.g., 2, 3, 4, 5 . . . ) depending on the channel pre-combiners 32, 34. In the example shown here, the pre-combiner 32 supports 2 channels, and the channel pre-combiner 34 supports 4 channels. Those of ordinary skill in the art will recognize any number C, C being an integer, can be supported for pre-combining. However, routing granularity also scales with the number of pre-combined channels, the objective is in finding balance in terms of channels to the group routed. Further, as described herein, a channel is formed by a single physical optical modem 20. The optical modem 20 could support multiple wavelengths, flexible grid spectrum, advanced modulation formats, etc. That is, a port/channel represents a physical connection to the channel pre-combiners 32, 34 connects to a physical port on the CWSS-based M×N CCMD 30. Of note, the systems and methods work for different baud rates (e.g., 37, 56, 75, 90 GBaud, etc.) as long as the amplifiers factor in the total power required to maintain the power spectral density.

Of note, there is a need for inter-channel and, especially for the very large spectral slices we contemplate, intra-channel equalization. The most efficient device to do this is the WSS and the simplest implementation of that is to tie it to the degree/direction being equalized. There is an argument that one could use the layer of WSS's to perform these functions, but the complexity of the joint control of the space switch and the WSS shared across channels and degrees makes this more complex and without any benefit of reduced equipment.

SDM has been proposed as a mechanism to construct larger ROADM nodes by interconnecting multiple ROADM network elements, whereas we are using SDM internal to the ROADM network element to create one large node. That is, the present disclosure utilizes the fiber/space switches 12 for a mechanism to dynamically interconnect WSS modules, i.e., the degrees. Our SDM block replaces the interconnect lines between the WSS modules. The disclosure is about a new method of constructing a wavelength switch based on the premise that future wavelengths with very wide spectral widths can be switched using a different architecture which uses a programmable, partial mesh interconnect of WSS modules (which can be implemented with a space switch), rather than a static, full mesh WSS interconnect (which requires more costly WSS modules that have more ports). This new ROADM architecture could be deployed with or without an external space switch.

In an embodiment, a ROADM node 10 includes a plurality of degrees 14; one or more add/drop components 16; and one or more fiber/space switches 12, wherein each of the plurality of degrees 14 and the one or more add/drop components 16 connect to the one or more fiber/space switches 12, and the one or more fiber/space switches 12 are configured to interconnect any of the plurality of degrees 14 and the one or more add/drop components 16.

The plurality of degrees 14 are partially interconnected to one another, while supporting any-to-any interconnect based on a configuration of the one or more fiber/space switches 12. This advantageously enables construction of a large ROADM node 10 with conventional components, namely removing the requirement for higher port count WSSs to support high degree ROADMs.

Capacity of ports on the plurality of degrees 14 can be defined in terms of spectrum including any of superchannels and media channels. Capacity of ports on the plurality of degrees 14 can be defined in spectral slices including any of 1.2 THz and 600 GHz. A number of ports on a Wavelength Selective Switch (WSS) for each of the plurality of degrees 14 can be equal to or less than a number of spectral slices, each spectral slice including a swath of spectrum switchable in the ROADM node.

In some examples, the plurality of degrees 14 can include a 1×N Wavelength Selective Switch (WSS), N 32. The plurality of degrees 14 can include a 1×8 Wavelength Selective Switch (WSS), for up to 32 degrees and support for 8 spectral slices, each spectral slice including a swath of spectrum switchable in the ROADM node 10, and the one or more fiber/space switches 12 are 128×128, or less.

The one or more add/drop components can include Wavelength Selective Switches (WSSs), thin film filters, Arrayed Waveguide Grating (AWGs), and/or one or more pre-combiners connected to the one or more fiber/space switches. Also, the one or more add/drop components can include direct connectivity between transceiver and the one or more fiber/space switches. This approach is advantageous on new builds or low add/drop counts.

The ROADM 10 can include control configured to selectively set connectivity of the one or more fiber/space switches. The ROADM node can support switching of up to 9.6 THz of spectrum in a plurality of spectral slices. Also, it is expected that the spectrum band can be in excess of 9.6 THz with the use of other bands, expansion of the C and/or L band, etc., and these embodiments are contemplated with the present disclosure.

In another embodiment, a ROADM 10 includes one or more fiber/space switches 12 configured to selective interconnect a plurality of degrees 14 and one or more add/drop components 16 such that the plurality of degrees 14 are partially interconnected to one another, while supporting any-to-any interconnect based on a configuration of the one or more fiber/space switches 12, wherein the one or more fiber/space switches 12 switch at a spectral slice level, each spectral slice including a swath of spectrum switchable in the ROADM 10.

The spectral slice can be greater than or equal to 600 GHz. The ROADM 10 can support switching of up to 9.6 THz of spectrum in a plurality of spectral slices.

Figure 7:
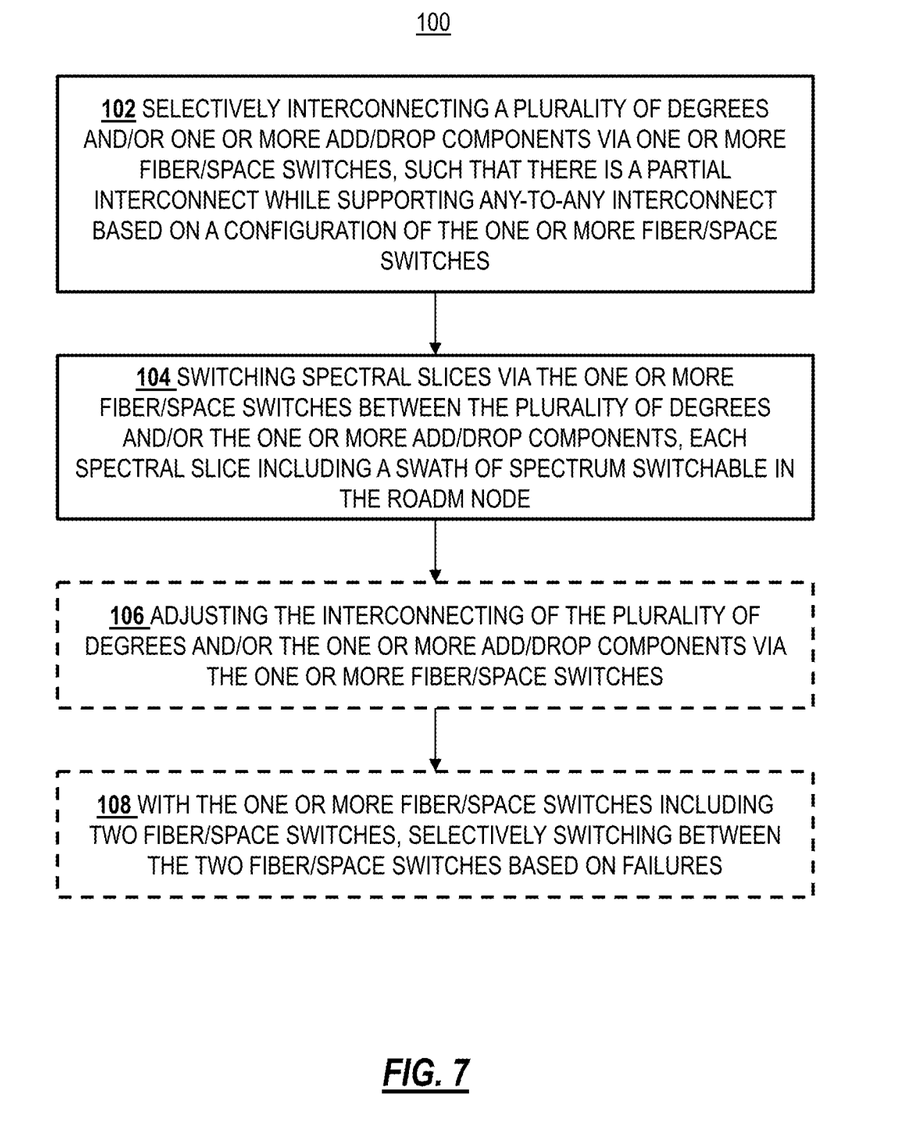
FIG. 7 is a flowchart of a process of operating a ROADM.

FIG. 7 is a flowchart of a process 100 of operating a ROADM 10. The process 100 includes selectively interconnecting a plurality of degrees and/or one or more add/drop components via one or more fiber/space switches, such that there is a partial interconnect while supporting any-to-any interconnect based on a configuration of the one or more fiber/space switches (step 102); and switching spectral slices via the one or more fiber/space switches between the plurality of degrees and/or the one or more add/drop components, each spectral slice including a swath of spectrum switchable in the ROADM node (step 104).

The process 100 can include adjusting the interconnecting of the plurality of degrees and/or the one or more add/drop components via the one or more fiber/space switches (step 106). The process 100 can include with the one or more fiber/space switches including two fiber/space switches, selectively switching between the two fiber/space switches based on failures (step 108).

Figure 8:
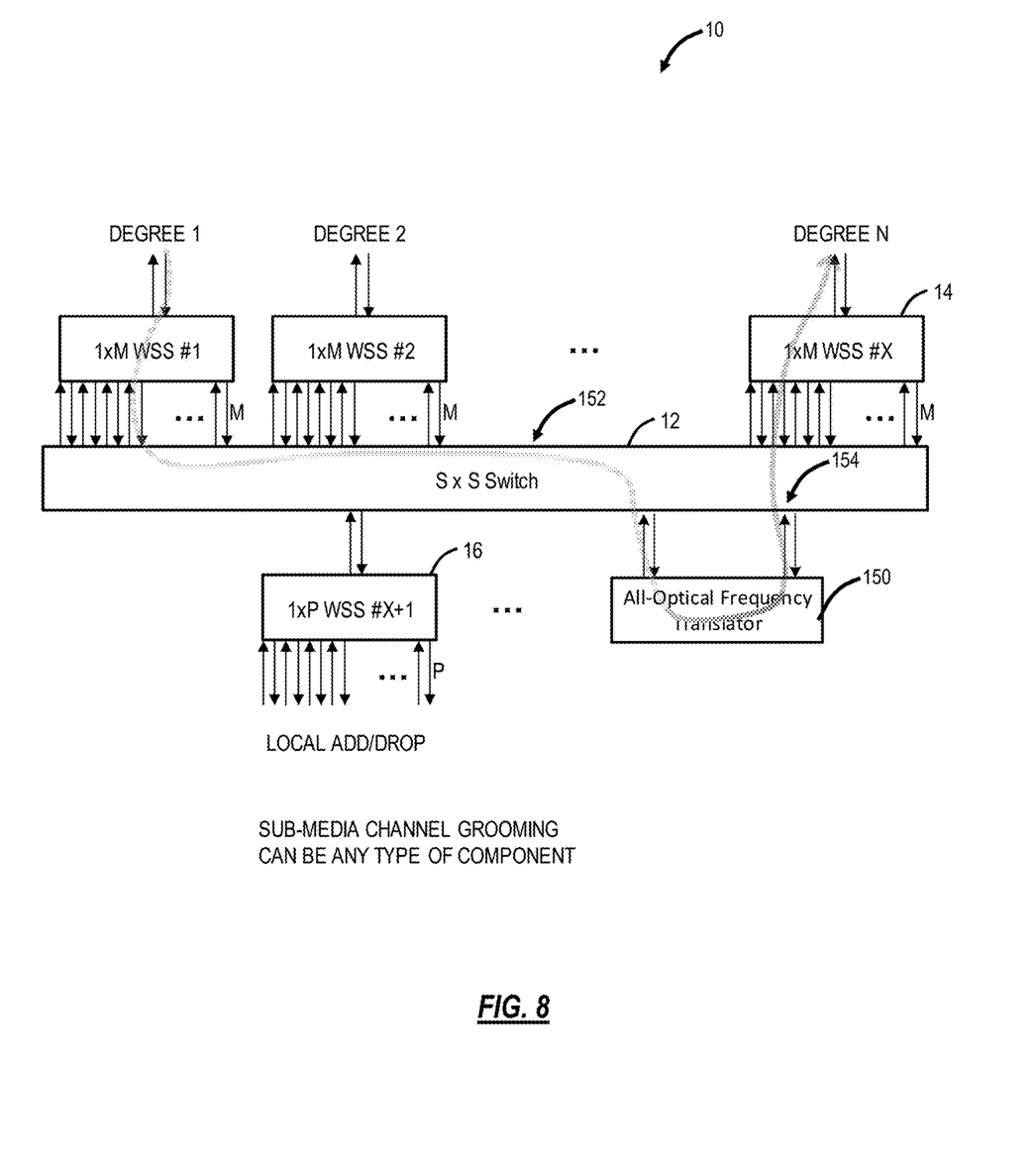
FIG. 8 is a diagram of the ROADM of FIG. 2 illustrating inline optical processing.

FIG. 8 is a diagram of the ROADM 10 illustrating inline optical processing, such as with an example all-optical frequency translator 150. Also, this architecture supports inline patching. Imagine there is a useful optical processing function that could be in the optical chain. Today it is really not practical, as interconnect fibers always have more than one channel potentially on them. In this architecture, it is possible to only have a single superchannel on each fiber and therefore each OXC port. These functions could be simple like filtering or amplification, or they could be more complex like optical wavelength conversion or optical regeneration (2R or 3R). One of the main reasons all optical wavelength conversion is not employed today is it is best used with a single channel whereas the architecture described herein is given to that naturally. One could connect these facilities to port-pairs the OXC and use them to process a superchannel through it before Add, Drop or even Passthrough. Optical wavelength conversion would allow the equivalent to Time-Slot-Interchange (TSI) in SONET switching and could be used to unblock optical paths and allow higher spectral utilization in mesh networks.

FIG. 8 shows a channel routed from one degree to an inline function (optical in/optical out). This example is an all-optical frequency translator which uses optical processing to change the frequency of the light without affecting the modulation. This could be achieved by creating a copy of the input signal using non-linear processes like four-wave mixing. Only one path is shown where a frequency 152 light ingresses at degree one, is translated to frequency 154 and then egresses at degree N. There is a complementary reverse path the flows from degree N to degree 1 and is translated from frequency 154 to frequency 152 which is not shown for clarity. This allows for programmable frequency translation in the optical domain which can reduce frequency blocking in a mesh network. Other optional in-line functions are contemplated as described above.

For control of the ROADM node and the fiber/space switches 12, it will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs), and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A Reconfigurable Optical Add/Drop Multiplexer (ROADM) node comprising:
    a plurality of degrees;
    one or more fiber/space switches,
        wherein each of the plurality of degrees connect to the one or more fiber/space switches, and the one or more fiber/space switches are configured to interconnect any of the plurality of degrees,
        wherein each of the plurality of degrees comprises a Wavelength Selective Switch (WSS) configured to switch spectral slices, each spectral slice comprising a contiguous swath of optical spectrum, and
        wherein the one or more fiber/space switches provide a dynamically reconfigurable partial-mesh interconnection between the plurality of degrees, such that only degrees requiring interconnection based on traffic demands are interconnected.

2. The ROADM node of claim 1, wherein the plurality of degrees are partially interconnected to one another, while supporting any-to-any interconnect based on a configuration of the one or more fiber/space switches.

3. The ROADM node of claim 1, wherein capacity of ports on the plurality of degrees are defined in terms of spectrum including any of superchannels and media channels.

4. The ROADM node of claim 1, wherein capacity of ports on the plurality of degrees are defined in spectral slices including any of 1.2 THz and 600 GHz.

5. The ROADM node of claim 1, wherein a number of ports on a Wavelength Selective Switch for each of the plurality of degrees is equal to or less than a number of spectral slices, each spectral slice including a swath of spectrum switchable in the ROADM node.

6. The ROADM node of claim 1, wherein the plurality of degrees include a 1×N Wavelength Selective Switch (WSS), N≤32.

7. The ROADM node of claim 1, wherein a size of a Wavelength Selective Switch (WSS) now only defines the granularity at which spectral slices are switched, and the one or more fiber/space switches define nodal capacity.

8. The ROADM node of claim 1, further comprising one or more add/drop components that connect to the one or more fiber/space switches, wherein the one or more fiber/space switches are configured to interconnect any of the plurality of degrees and the one or more add/drop components.

9. The ROADM node of claim 8, wherein the one or more add/drop components include Wavelength Selective Switches (WSSs).

10. The ROADM node of claim 8, wherein the one or more add/drop components include any of thin film filters and Arrayed Waveguide Grating (AWGs).

11. The ROADM node of claim 8, wherein the one or more add/drop components include direct connectivity between transceiver and the one or more fiber/space switches.

12. The ROADM node of claim 8, wherein the one or more add/drop components include one or more pre-combiners connected to the one or more fiber/space switches.

13. The ROADM node of claim 8, wherein the one or more fiber/space switches include 1: N fiber/space switches for redundancy and to scale interconnect between the plurality of degrees.

14. The ROADM node of claim 1, further comprising
    control configured to selectively set connectivity of the one or more fiber/space switches.

15. The ROADM node of claim 1, further comprising one or more inline optical processing functions connected to the one or more fiber/space switches, wherein the one or more fiber/space switches are configured to interconnect any of the plurality of degrees and the one or more inline optical processing functions.

16. The ROADM node of claim 15, wherein the inline optical processing functions includes filtering of a given superchannel or media channel between a port of the plurality of degrees and a port of one or more add/drop components.

17. The ROADM node of claim 15, wherein the inline optical processing functions includes amplification between two ports of the one or more fiber/space switches.

18. The ROADM node of claim 15, wherein the inline optical processing functions includes wavelength conversion or optical regeneration between two ports of the one or more fiber/space switches.

19. A method of operating a Reconfigurable Optical Add/Drop Multiplexer (ROADM) node comprising steps of:
    responsive to interconnecting a plurality of degrees and one or more add/drop components to one or more fiber/space switches, configuring the one or more fiber/space switches to selectively and partially interconnect the plurality of degrees to one another; and
    responsive to a requirement to add/drop channels at the ROADM node, configuring the one or more fiber/space switches to selectively interconnect the plurality of degrees to the one or more add/drop components,
    wherein each of the plurality of degrees comprises a Wavelength Selective Switch (WSS) configured to switch spectral slices, each spectral slice comprising a contiguous swath of optical spectrum, and
    wherein the one or more fiber/space switches provide a dynamically reconfigurable partial-mesh interconnection between the plurality of degrees, such that only degrees requiring interconnection based on traffic demands are interconnected.

20. The method of claim 19, wherein the steps further include
    responsive to a requirement for one or more optical processing functions, configuring the one or more fiber/space switches to selectively interconnect ports in the ROADM node to the one or more optical processing functions.

* * * * *